F. H. GREENWOOD.
AUTOMATIC HOBBING MACHINE.
APPLICATION FILED JULY 17, 1916.

1,304,874.

Patented May 27, 1919.
9 SHEETS—SHEET 4.

Witnesses:
J. C. Devick.
George L. Chindahl.

Inventor:
F. H. Greenwood.
By Luther R. Miller
atty

F. H. GREENWOOD.
AUTOMATIC HOBBING MACHINE.
APPLICATION FILED JULY 17, 1916.

1,304,874.

Patented May 27, 1919.

Witnesses:
J. C. Devick.
George L. Chindahl.

Inventor:
F. H. Greenwood.
By Luther L. Miller
Atty

F. H. GREENWOOD.
AUTOMATIC HOBBING MACHINE.
APPLICATION FILED JULY 17, 1916.

1,304,874.

Patented May 27, 1919.
9 SHEETS—SHEET 6.

Witnesses:
J. C. Devir
George L. Churchill

Inventor:
F. H. Greenwood.
By Luther L. Miller
Atty

F. H. GREENWOOD.
AUTOMATIC HOBBING MACHINE.
APPLICATION FILED JULY 17, 1916.

1,304,874.

Patented May 27, 1919.
9 SHEETS—SHEET 9.

Witnesses:
J. C. Devick
Geo. L. Churchill

Inventor:
F. H. Greenwood
Luther L. Miller
Atty.

UNITED STATES PATENT OFFICE.

FRED H. GREENWOOD, OF ROCKFORD, ILLINOIS, ASSIGNOR TO HOWARD C. COLMAN, LUTHER L. MILLER, AND HARRY A. SEVERSON, COPARTNERS, DOING BUSINESS AS BARBER-COLMAN COMPANY, OF ROCKFORD, ILLINOIS.

AUTOMATIC HOBBING-MACHINE.

1,304,874.   Specification of Letters Patent.   Patented May 27, 1919.

Application filed July 17, 1916. Serial No. 109,697.

*To all whom it may concern:*

Be it known that I, FRED H. GREENWOOD, a citizen of the United States, residing at Rockford, in the county of Winnebago and State of Illinois, have invented certain new and useful Improvements in Automatic Hobbing-Machines, of which the following is a specification.

This invention relates to machines for producing gear wheels, spline shafts and other machines by the hobbing process; and the object of the invention is to provide such a machine with automatic mechanisms whereby the idle periods of the machine are reduced to a minimum. In the present embodiment of the invention, all operations are automatically performed except the operation of removing finished gears from a magazine and replacing such gears with gear blanks.

In the accompanying drawings, Figure 1 is a front elevation of a hobbing machine embodying the features of my invention. Fig. 1ª is a sectional view of a gear train comprised in the machine. Fig. 22 is a fragmental view of the rear side of the machine. Fig. 23 is a section on line 23 of Fig. 28. Figs. 24 and 25 are fragmental detail views. Figs. 26 and 27 illustrate the means for clamping and unclamping a support for the arbor that carries the blanks being cut. Fig. 28 illustrates the means for sliding said support and the magazine into and out of operative position. Fig. 28ª is a fragmental detail view of the means for alining the arbors with the work spindle.

Figures 1, 1A:
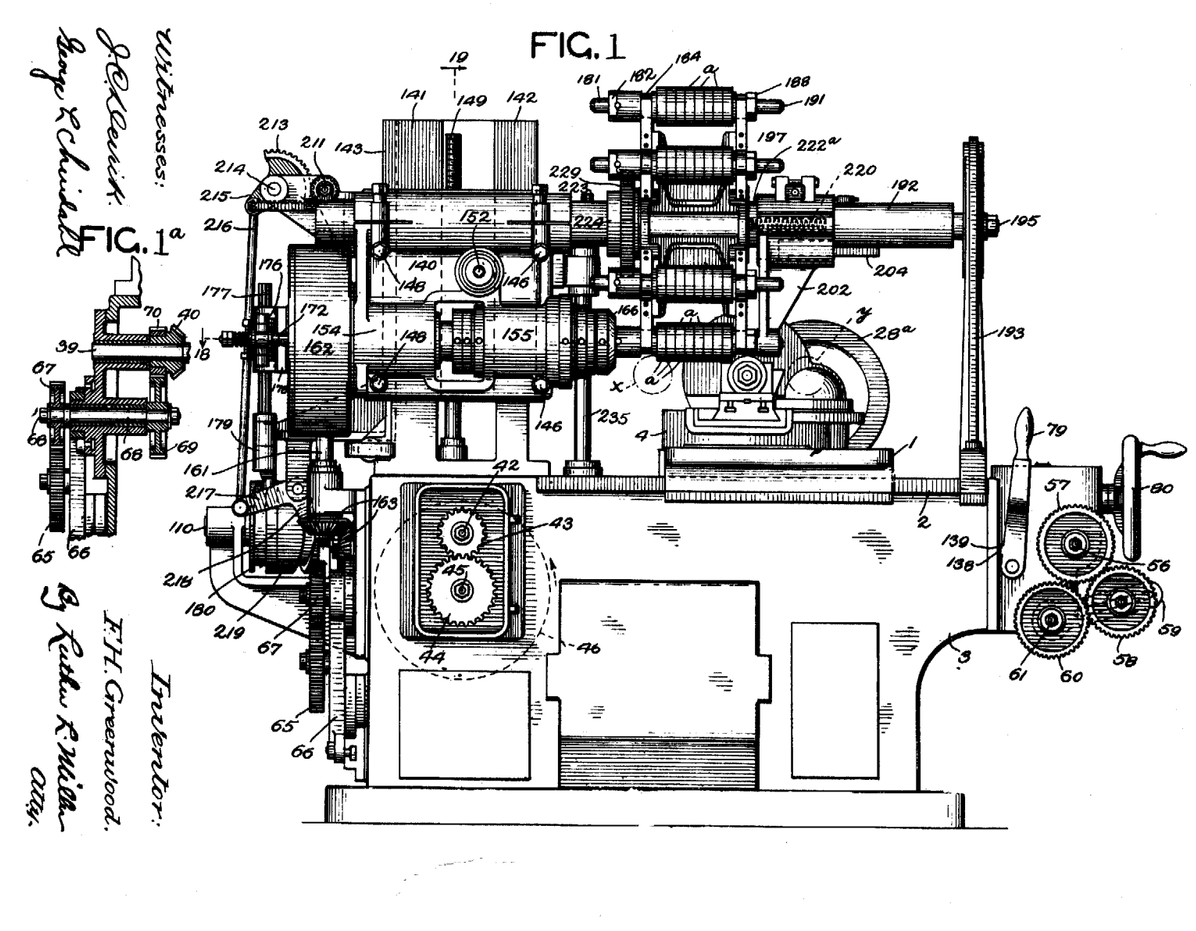
Figure 8:
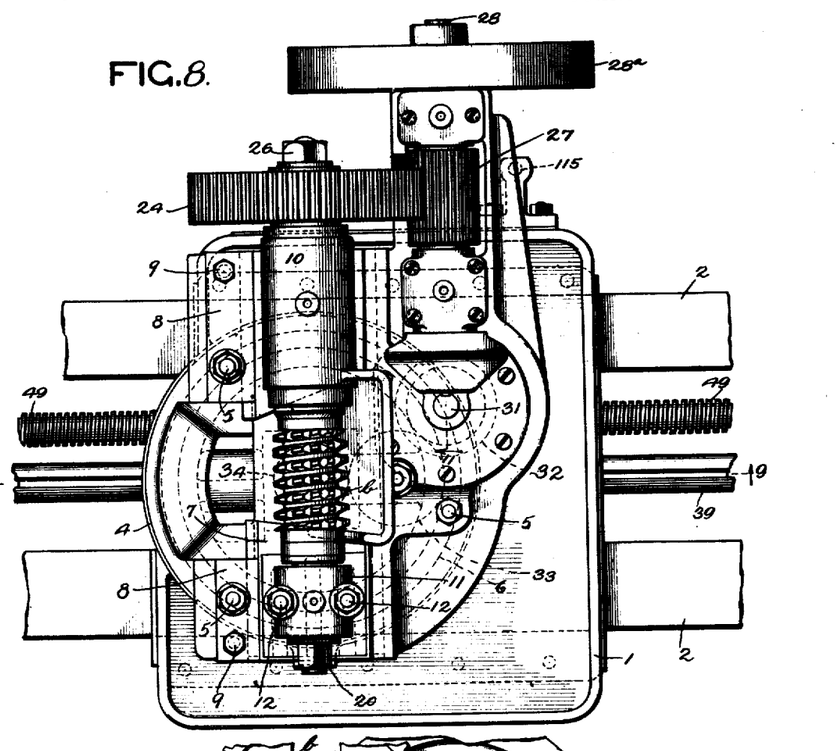
Fig. 8 is a top plan view of the hob carriage and the parts supported thereby.
Figure 9:
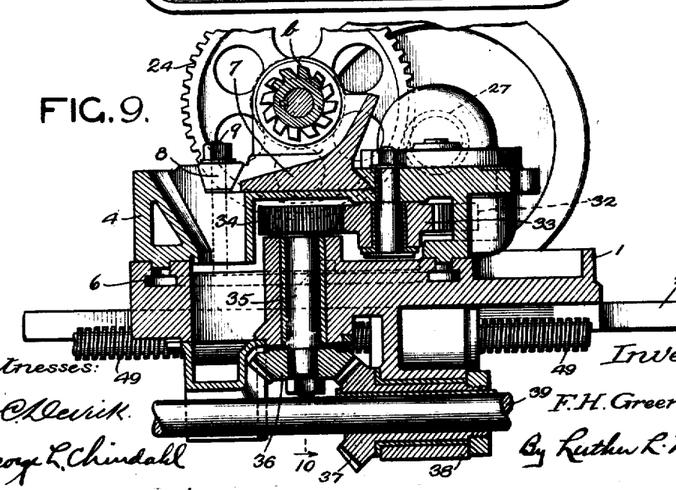
Fig. 9 is a vertical sectional view through the hob carriage and the parts mounted thereon, taken in the plane of dotted line 9—9 of Fig. 8.
Figure 10:
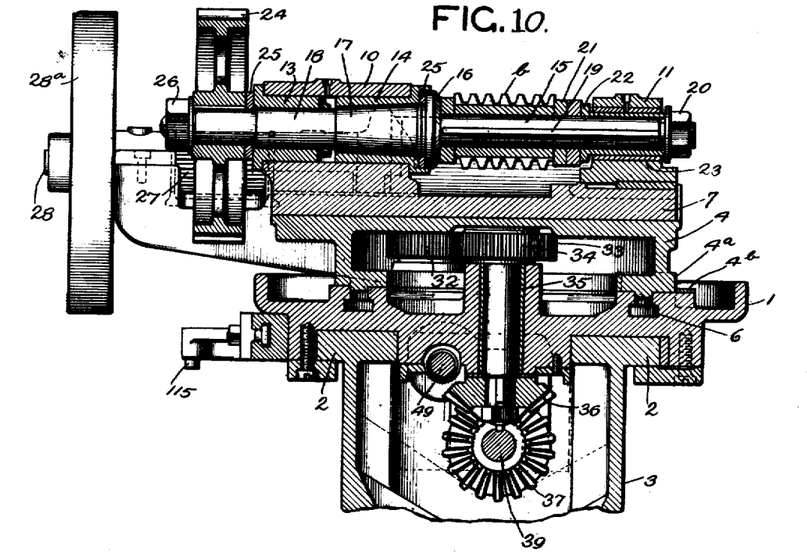
Fig. 10 is a vertical sectional view taken in the plane of dotted line 10 of Fig. 9.

Referring to Fig. 1: *a* are spur gear blanks in the form of disks, said disks being arranged in groups. Each group is mounted upon a rotatable arbor, and the arbors are successively brought into such position that the blanks thereon are in the path of travel of the hob *b*, (Figs. 8 and 9). The hob is mounted upon a carriage 1 which is slidably mounted upon guides 2 on the bed 3. The carriage 1 is provided with a hob swivel 4 arranged for rotation in a horizontal plane. Preferably the portion 4ª (Fig. 10) of the swivel is graduated to coöperate with a vernier indicated at 4ᵇ on the carriage 1. In use, the swivel 4 is turned to an angle to the plane of the blanks equal to the angle of the helices of the hob, and is secured in adjusted position by means of bolts 5 whose heads lie within a T-slot 6 (Fig. 9) in the carriage 1. For the sake of simplicity in the drawings, the swivel 4 is not shown adjusted to the angle required in cutting spur gears. Upon the hob swivel 4 is a slide 7 (Figs. 8, 9 and 10) arranged to be fixed to the swivel in adjusted position by means of taper gibs 8 and bolts 9. The hob slide 7 is provided with a fixed bearing 10 and a removable bearing 11, the latter being secured to the slide by bolts 12. In the rear portion of the bearing 10 is fixed a bushing 13 (Fig. 10) having a cylindrical bore. In the inner portion of the bearing 10 is fixed a bushing 14 having a tapered bore.

Figure 2:
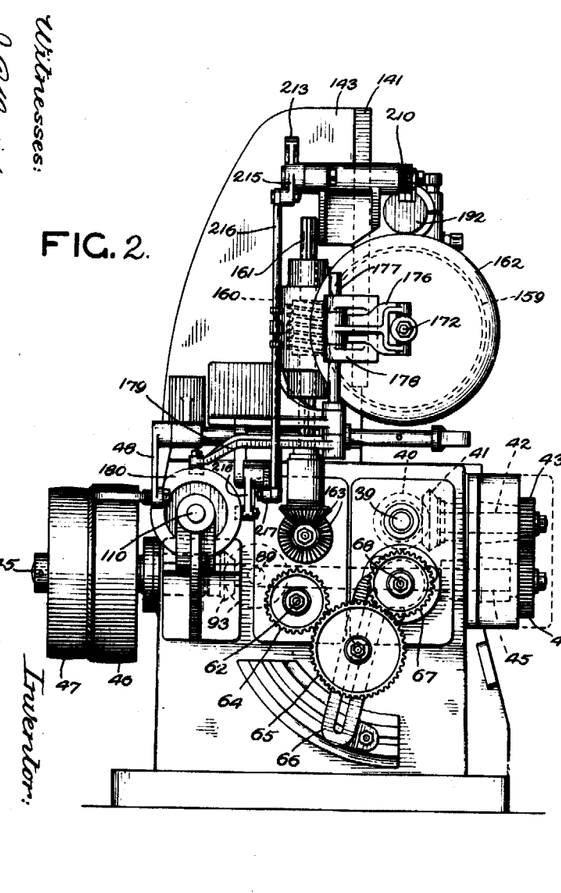
Fig. 2 is an elevation of the head end of the machine, the hob carriage being omitted.
Figures 11, 12:
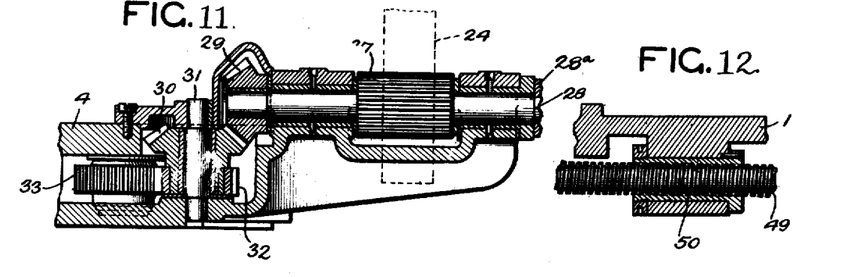
Fig. 11 is a view taken in the plane of dotted line 11 of Fig. 8.
Fig. 12 is a sectional view illustrating the connection between the hob carriage and the feed screw.

The hob spindle comprises a cylindrical portion 15, a collar or annular flange 16, a tapered portion 17 running in the correspondingly-tapered bushing 14 and a cylindrical portion 18 running in the bushing 13. The hob $b$ is fixed upon the cylindrical portion 15 by means of a key 19 and by means of a nut 20 turned upon the forward screw-threaded end of the spindle, said nut being adapted to clamp the hob, the washers 21 and the sleeve 22 between itself and the flange 16. The sleeve 22 turns with the shaft within a bushing 23 in the bearing 11. A spur gear 24 is keyed upon the rear end of the hob spindle. Preferably washers 25 are interposed between the flange 16 and the bushing 14 and between the gear 24 and the bushing 13. The wear of the washers 25, the bushing 14 and the hob spindle is taken up by means of a nut 26 turned upon the rear screw-threaded end of the hob spindle. The spur gear 24 meshes with a pinion 27 (Fig. 8) fixed upon a shaft 28 rotatably mounted in bearings upon the swivel 4. On the rear end of the shaft 28 is fixed a fly wheel 28$^a$. On the forward end of the shaft 28 is fixed a bevel gear 29 (Fig. 11) meshing with a similar gear 30 mounted upon a short vertical shaft 31. Fixed to the bevel gear 30 is a gear 32 that meshes with an intermediate gear 33 which in turn meshes with a gear 34 (Fig. 10) upon a vertical shaft 35, the axis of which shaft coincides with the axis of rotation of the hob swivel 4 and intersects the axis of the hob spindle. Upon the lower end of the shaft 35 is fixed a miter gear 36 that meshes with a similar gear 37 which is rotatably mounted in a bearing 38 (Fig. 9) upon the carriage 1. The gear wheel 37 is splined upon a shaft 39 extending longitudinally of the bed 3. Upon the head end of the shaft 39 is fixed a bevel gear wheel 40 (Fig. 2) which meshes with a similar gear wheel 41 fixed upon a shaft 42. On the shaft 42 is a change gear wheel 43 that meshes with a change gear wheel 44 on a drive shaft 45. Upon the rear end of the drive shaft is a tight pulley 46 and a loose pulley 47. 48 is a belt shifter.

The hob carriage 1 is fed to carry the hob through the work at a relatively low speed, is returned to starting position at a higher speed, and is fed forward from the starting position to the work at such higher speed. The means for thus moving the carriage 1 comprises a feed screw 49 which is engaged by a nut 50 (Fig. 12) fixed to the carriage 1. The means for rotating the feed screw 49 at low speed comprises a worm wheel 51 (Fig. 14) arranged to mesh with a worm 52 which is fixed upon a constantly-driven shaft 53. Fixed upon the shaft 53 is a gear wheel 54 that meshes with a pinion 55 fixed on a shaft 56. The shaft 53 is mounted in a bracket 53$^a$ which is pivoted upon the shaft 56. Means to be later described is provided for lowering the bracket 53$^a$ to withdraw the worm 52 from the worm wheel 51 when the feed screw 49 is to be driven at high speed.

Upon the forward end of the shaft 56 is fixed a change gear 57 (Figs. 1 and 16) which meshes with a change gear 58 carried by a pivoted arm 59. Said arm may be secured in adjusted position by any ordinary means. The gear 58 meshes with a change gear 60 which is fixed upon a shaft 61 (Fig. 16), said shaft being driven from a shaft 62 through bevel gears 63. At the head end of the shaft 62 is a change gear 64 (Fig. 2) that meshes with a change gear 65 carried by an adjustable arm 66. The change gear 65 meshes with a change gear 67 on a shaft 68. (See Fig. 1$^a$). The shaft 68 is driven from the shaft 39 through gears 69 and 70.

Figures 14, 15, 16, 17:
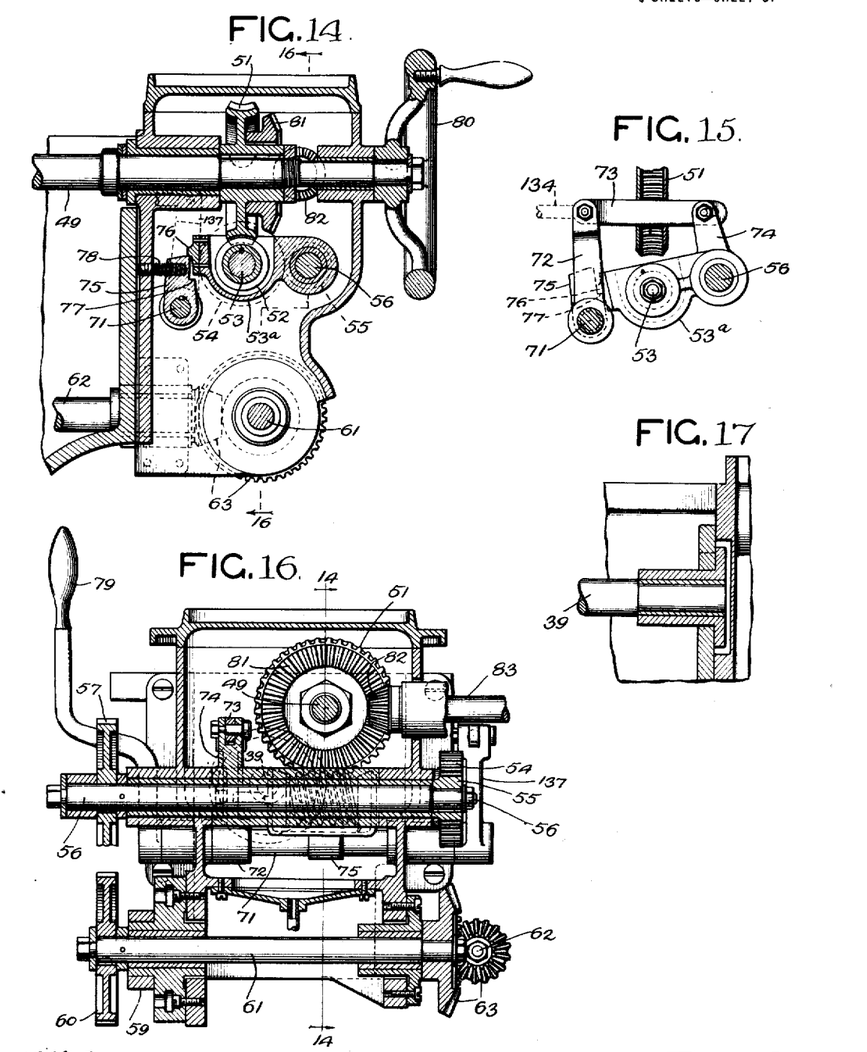
Fig. 14 is a view of the devices for driving the feed screw, the view being taken in the plane of line 14—14 of Fig. 16.
Fig. 15 is a view of the means for connecting and disconnecting the slow feed from the feed screw.
Fig. 16 is a view taken in the plane of dotted line 16—16 of Fig. 14.
Fig. 17 is a view showing the bearing for one end of the hob-driving shaft.

Means is provided for suspending the slow feed of the carriage 1 after the hob has finished cutting the teeth upon the blank or blanks, and for inaugurating the slow feed after the hob has been placed in position to begin cutting another blank or set of blanks. In the present embodiment the slow-feed-controlling means comprises a rock shaft 71 (Fig. 14) to which is fixed an arm 72 (Fig. 15) that is connected by means of a link 73 to an arm 74 which is rigid with the bracket 53$^a$. There is a pin and slot connection between the link 73 and the arm 74 as indicated in Fig. 15. A finger 75 (Fig. 14) is mounted upon the rock shaft 71 with freedom to turn slightly with relation to said shaft. Said finger is adapted to underlie a projection 76 on the worm shaft bracket 53$^a$ to support the worm 52 in mesh with the worm wheel 51. On the finger 75 is a shoulder 77 to support the projection 76 when the bracket 53$^a$ is in the lowered position shown in Fig. 15. The finger 75 is pressed against the bracket 53$^a$ by a compression spring 78. It will be seen that when the rock shaft 71 is turned in the counter-clock-wise direction as viewed in Fig. 14, the bracket 53$^a$ will drop, thus disengaging the worm 52 from the worm wheel 51. When the shaft 71 is turned in the clockwise direction the bracket 53$^a$ is raised through the action of the arm 72, link 73 and arm 74 to place the worm 52 in mesh with the worm wheel 51. As soon as the projection 76 has been elevated above the finger 75, the latter springs under said projection and holds the bracket elevated.

The means for automatically rocking the shaft 71 will be hereinafter described. For manually rocking said shaft a hand lever 79 is provided. After the bracket 53ª has been manually lowered, the feed screw 49 may be manually turned to adjust the position of the carriage 1 by means of a hand wheel 80.

The means for driving the feed screw 49 at high speed comprises a bevel gear 81 (Fig. 14) fixed with relation to the feed screw and meshing with a bevel pinion 82. Said pinion is fixed upon a shaft 83. This shaft is arranged to be driven alternately in opposite directions by means including two bevel gear wheels 84 and 85 (Fig. 5), said bevel gear wheels being loose upon the shaft 83 and meshing with a bevel gear wheel 86. The gear wheel 86 is rigidly connected to a bevel gear 87 (Fig. 22) that meshes with a bevel gear wheel 88 fixed upon one end of an intermittently-driven shaft 89.

Upon the opposite end of the shaft 89 is splined a clutch collar 90 which is slidable into and out of engagement with a clutch member 91 fixed to a shaft 92. The shaft 92 is driven directly from the drive shaft 45 through bevel gears 93.

Figure 30:
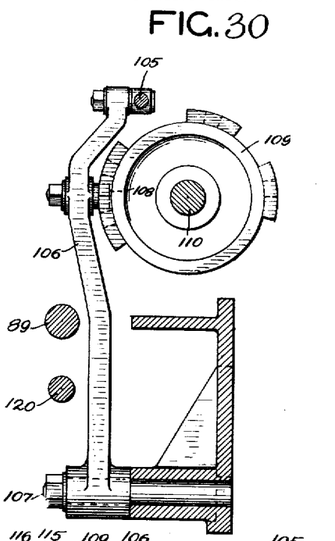
Fig. 30 is a view showing a portion of the devices for connecting the high speed drive to the feed screw for the hob carriage.
Figures 31, 32, 33:
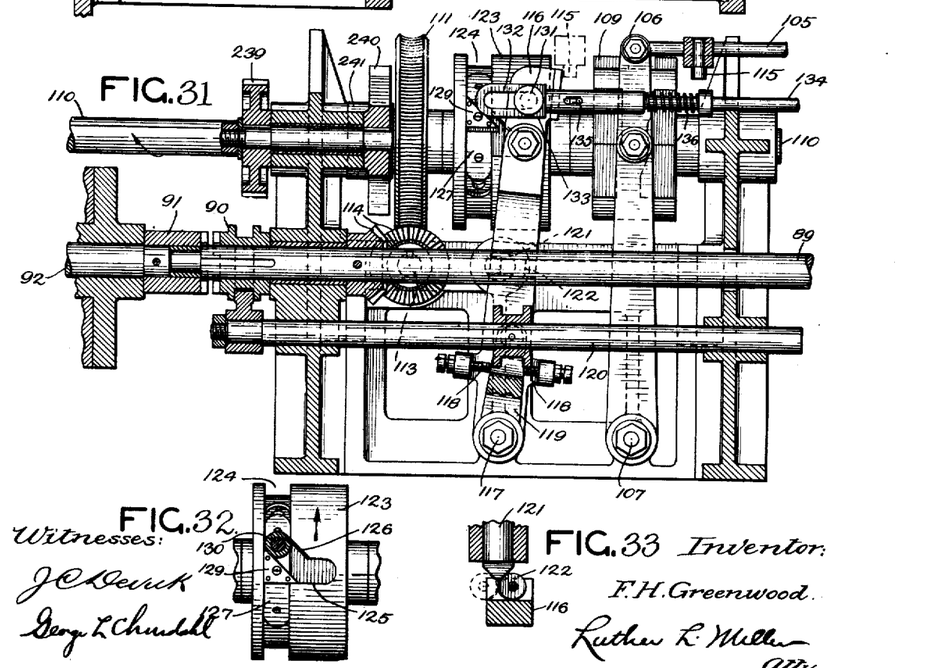
Fig. 31 is a side elevation of the parts shown in Figs. 29 and 30.
Fig. 32 is a view of one of the cams on the cam shaft.
Fig. 33 is a view of a spring plunger for completing the swinging movements of a certain lever.

The bevel pinions 84 and 85 are alternately clutched to the shaft 83 by means of a clutch collar 94 (Fig. 5) splined upon said shaft and arranged to engage clutch faces on said pinions. Said clutch collar is rotatively connected to an arm 95 supported upon a pivot 96. Rigid with the arm 95 is an arm 97 having a notch 98 arranged to be engaged by a V-shape spring plunger 99. The surfaces at opposite sides of the notch 98 are beveled, as shown, so that when the arm 97 is turned to remove the notch 98 from the spring plunger 99, said plunger, pressing against one of said beveled surfaces, turns the arms 97 and 95 to place the clutch collar 94 in engagement with one or the other of the clutch faces of the bevel gear wheels 84 and 85. Mounted upon the pivot 96 is an arm 100 carrying two adjustable stops 101 lying on opposite sides of a lug 102 upon an arm 103 which is rigid with the arms 95 and 97. The arm 100 is rigid with an arm 104 which is connected by means of a link 105 with a lever 106 pivoted to the machine frame at 107 (see Figs. 5, 30 and 31). The lever 106 carries a roller stud 108 which is arranged to be engaged by a cam 109 on the cam shaft 110.

The means for rotating the cam shaft 110 comprises a worm wheel 111 fixed on the shaft 110 and meshing with a worm 112 fixed upon a shaft 113. The shaft 113 is connected to the shaft 89 by bevel gears 114.

Figure 29:
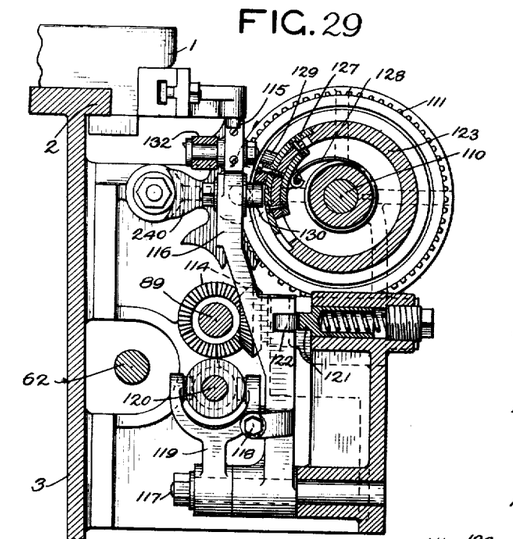
Fig. 29 is a sectional view showing the means for throwing in and out the slow feed for the hob carriage.

After a blank or group of blanks has been cut by the hob, the cam shaft 110 is rotated through a single revolution to effect the various operations preparatory to another working stroke of the carriage 1. For moving the clutch member 90 into engagement with the constantly-driven clutch member 91 upon the completion of each working stroke of the carriage 1, I provide upon said carriage an adjustably mounted tripping projection 115 (Figs. 5, 29 and 31) arranged to be carried into contact with the upper end of a lever 116 pivoted at 117 to the machine frame. The lever 116 carries adjustable stops 118 between which lies a fork 119 pivoted at 117. Said fork engages a clutch rod 120 which in turn engages the clutch member 90. 121 (Figs. 29 and 33) is a spring plunger having a V-shape forward end arranged to bear against an anti-friction roller 122 carried by the lever 116. When the projection 115 has moved the lever 116 until the roller 122 has begun to pass the point of the plunger 121, said plunger forces the lever 116 to the left (Fig. 31), thus quickly throwing in the clutch member 90. The high-speed shaft 89 is then driven, and the cam shaft 110 revolved.

The means for throwing out the clutch member 90 consists of a cam 123 fixed upon the shaft 110. Said cam has a circular groove 124 and a peripheral groove 125 extending parallel with the axis of the shaft 110 and communicating at one end with the groove 124. The forward side wall of the groove 125 is connected to one wall of the groove 124 by an inclined wall 126. A slide 127 has a short movement circumferentially of the cam 123 in the plane of the groove 124. A torsion spring 128 (Fig. 29) normally holds the slide 127 in the position shown in Fig. 31. On the slide 127 is a cam member 129. The lever 116 is provided with a roller stud 130 (Fig. 29) arranged to travel in the groove 124, the cam member 129 being adapted to force the roller 130 into the groove 125. By the time the roller 130 reaches the groove 125, the plunger 121, acting upon the roller 122, forces the lever 116 to the right (Fig. 31), thereby quickly throwing out the clutch member 90. As soon as the roller 130 leaves the cam member 129 the latter springs forward so as to leave the groove 125 clear for the leftward movement of the roller.

The lever 116 has a pin 131 which lies within a slot 132 formed in a head 133. Said head is slidably connected to a link 134 by means of a pin 135 lying within an elongated opening in said head. A spring 136 normally holds the head 133 in the position shown in Fig. 31. The link 134 is connected to an arm 137 fixed to the rock shaft 71.

It will be seen that when the clutch collar 90 is thrown in to drive the high-speed shaft 89 the shaft 71 is turned to lower the low-speed worm 52 out of engagement with the worm wheel 51. When the clutch collar 90 is thrown out, the worm 52 is raised into mesh with the worm wheel 51. The yielding connection between the head 133 and the link 134 permits the lever 116 to complete the clutch-disengaging movement even though the worm 52 should strike against the ends of the teeth of the worm wheel. Said yielding connection also permits of manual operation of the lever 79 to throw out the worm 52. Movement of the lever 79 beyond what is necessary to throw out the worm is prevented by contact of a lug 138 (Fig. 1) on said lever with a stop 139 on the machine frame.

The work is supported upon a slide 140 (Fig. 1) which is mounted upon vertical guides 141 and 142 on a column 143 rising from the bed 3. On the slide 140 is a guide 144 (Fig. 18) lying between the guides 141 and 142. The slide 140 is held against lateral play by a bar 145 extending at the rear side of the guide 142 and secured to the slide by screws 146 operable from the front of the machine; and by a taper gib 147 lying between the guide 141 and a portion of the slide, said gib being secured by screws 148. In operation, the slide 140 is held rigidly clamped to the column 143 by means of the screws 146 and 148.

The slide 140 is adjusted to the desired height by means of a vertical screw 149 (Figs. 1, 18 and 19) fixed in the framework and engaging a nut 150 which is revolubly mounted in a bearing 151 upon the slide. The nut 150 is arranged to be rotated by means of a spindle 152 (Fig. 20) rotatably mounted in the slide and having fixed to its rear end a spiral gear 153 that meshes with spiral gear teeth formed upon the nut 150. The forward end of the spindle 152 is squared to receive a crank.

Figures 18, 19, 20, 21:
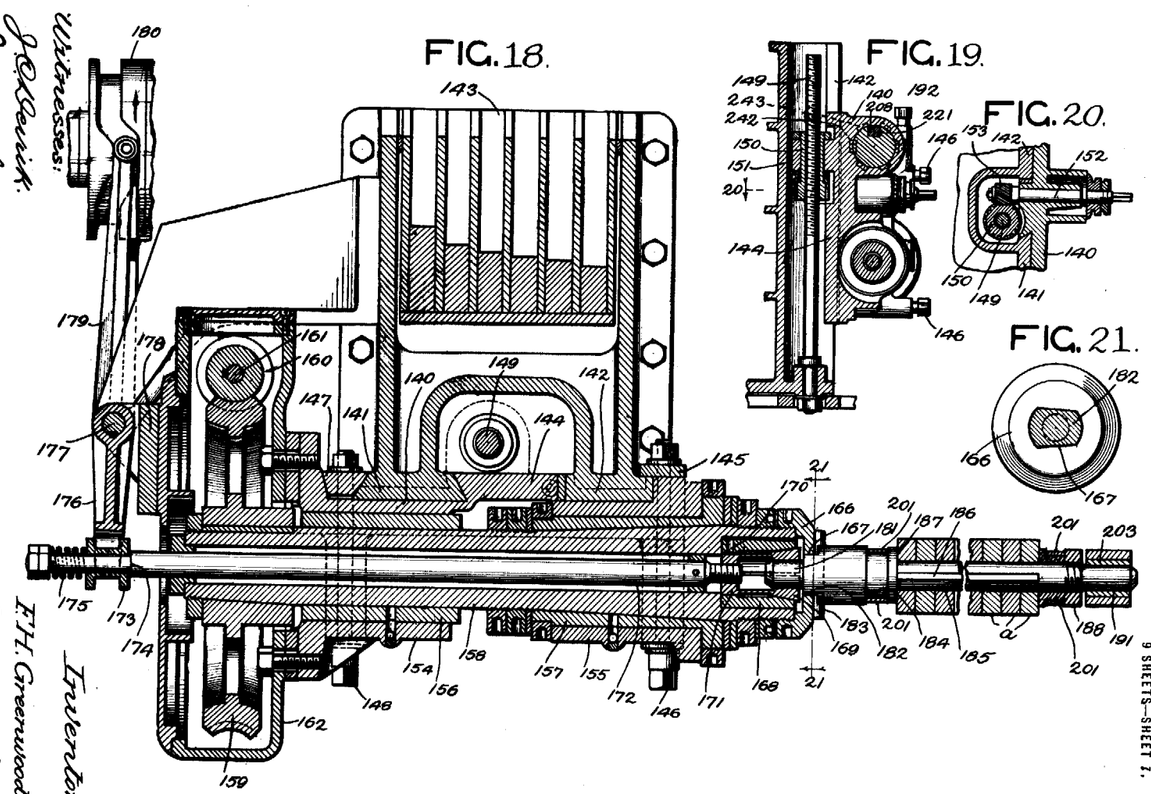
Fig. 18 is a view taken in the plane of line 18 of Fig. 1.
Fig. 19 is a view taken in the plane of dotted line 19 of Fig. 1.
Fig. 20 is a section on line 20 of Fig. 19.
Fig. 21 is a view taken in the plane of line 21—21 of Fig. 18.

The slide 140 is provided with two horizontal alined bearings 154 and 155 (Fig. 18). In the bearing 154 is fixed a bushing or bearing sleeve 156 having a cylindrical bore, while in the bearing 155 is fixed a bushing 157 having a tapered bore. Rotatably mounted in the bushings 156 and 157 is a work spindle 158 having a cylindrical portion within the bushing 156 and a tapered portion within the bushing 157.

Figure 13:
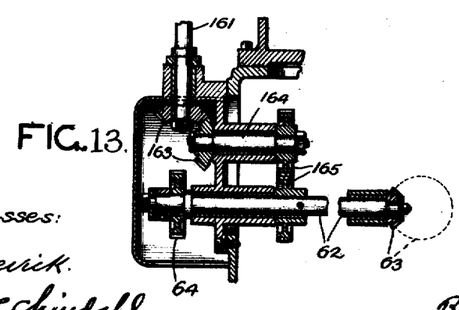
Fig. 13 is a view of certain gear trains used in the machine.

Upon the head end of the work spindle 158 is keyed a worm wheel 159 meshing with a worm 160 which is splined upon a vertical shaft 161. The worm wheel 159 and the worm 160 are inclosed within a gear casing 162 which is fixed to the slide 140, the worm being supported in said casing against endwise movement of the worm with relation to the casing and slide. The lower end of the shaft 161 is connected by means of miter gears 163 (Figs. 1 and 13) with a shaft 164 which in turn is connected by means of gears 165 to the shaft 62. The spindle 158 is provided with means for clamping a work-supporting arbor and for causing the arbor to rotate with the spindle. The means herein shown for this purpose comprises a cap 166 (Figs. 18 and 21) secured upon the end of the work spindle and having a non-cylindrical opening 167 to receive a similarly-shaped portion of the arbor. Within the adjacent portion of the spindle 158 is a collet sleeve 168 having an interiorly-tapered portion to receive a collet 169. The collet is caused to rotate with the collet sleeve 168 by means of a pin 170 set in the collet sleeve and extending into a groove in the base 171 of the collet. Said base is screwed upon a rod 172 that is slidable longitudinally of the spindle 158. A peripherally grooved collar 173 is slidable longitudinally of the rod 172, being normally held against a shoulder 174 on said rod by a spring 175. A fork 176 engaging the collar 173 is splined upon a vertical rock shaft 177. The fork 176 is mounted within a bearing bracket 178 fixed to the gear casing 162, the shaft 177 extending slidably through said bracket. To the lower end of the shaft 177 is fixed an arm 179 carrying a roller stud that runs in the groove of a cam 180 fixed upon the cam shaft 110. When the cam shaft is revolved, the rod 172 is reciprocated to release the arbor carrying the gears just cut and to clamp another arbor supporting gear blanks.

Figures 3, 4:
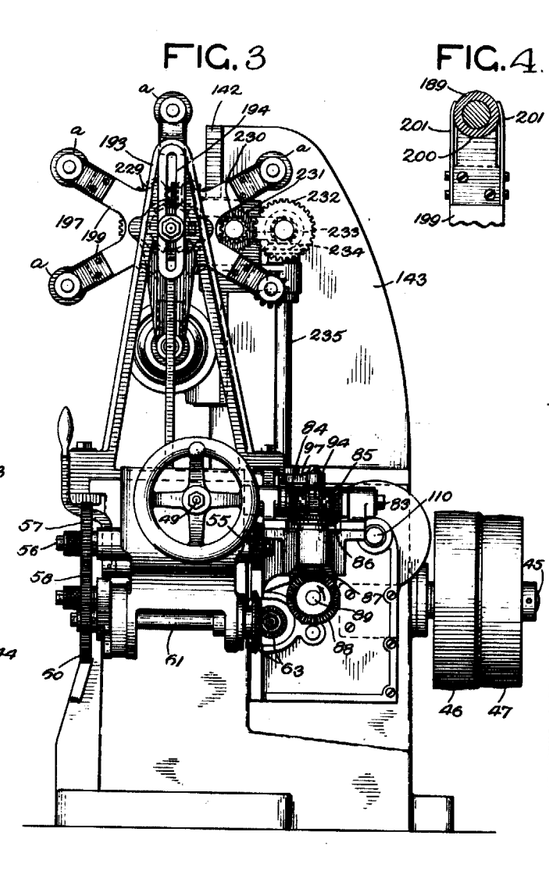
Fig. 3 is an elevation of the opposite end of the machine, the hob carriage also being omitted from this view.
Fig. 4 is a fragmental view of the means for releasably securing work arbors in the magazine.

As indicated in Figs. 1 and 3, the machine comprises a magazine adapted to contain a suitable number of arbors. The form of arbor herein shown consists of an end portion 181 (Fig. 18) adapted to be clamped in the collet 169; a non-cylindrical portion 182 adapted to fit into the opening 167 of the cap 166; a stop pin 183 adapted to stop against the cap 166; a portion 184 having a peripheral groove for engagement by clamping devices on the magazine; a cylindrical portion 185 upon which gear blanks $a$ may be strung; a key 186 to enter keyways in the gear blanks to prevent relative rotation of the blanks and the arbor; a shoulder 187 against which the blanks are clamped by a nut 188, said nut having a peripheral groove to receive clamping devices on the magazine; and an end portion 191 adapted to be supported as hereinafter described.

The magazine may be of any suitable form and character and may be supported and controlled in any suitable way. The present embodiment of the invention comprises a magazine which is rotatively supported upon an overhanging arm 192 (Fig. 1) which is rigidly connected at one end to the slide 140. The other end of the arm 192 may be supported and steadied in any suitable manner. Herein is shown a standard 193 secured to the bed 3 and having a vertical slot 194 (Fig. 3) to receive a stud 195 (Fig. 28) fixed to the end of the arm 192. 196 is a nut on the outer end of said stud.

Figures 22, 23, 24, 25, 26, 27, 28, 28A:
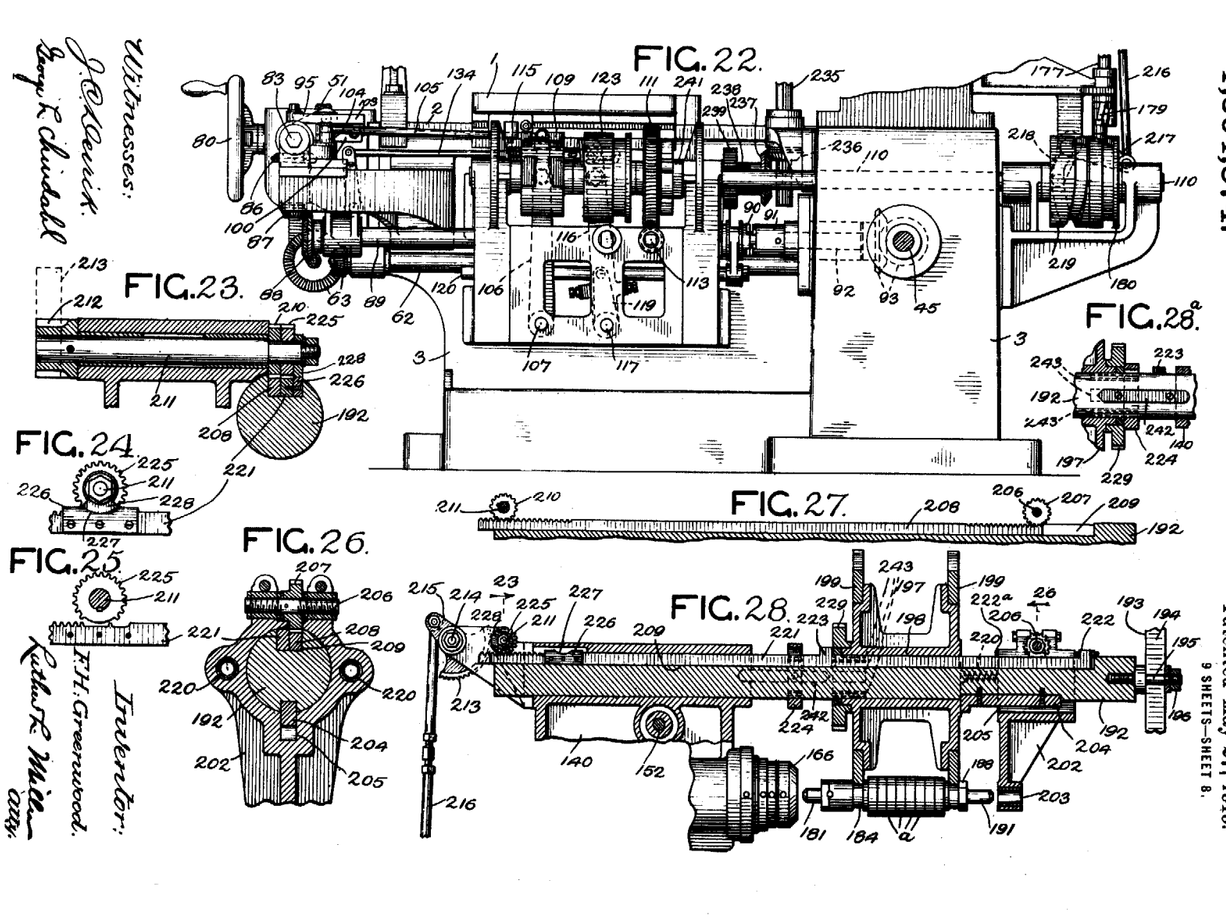

The magazine 197 comprises a hub 198 (Fig. 28) and pairs of radial arms 199, said hub being rotatively and slidably mounted upon the arm 192. The outer ends of the arms 199 are notched as at 200 (Fig. 4) to receive the grooved portions 184 and 188. At the opposite sides of the outer end of each arm 199 are springs 201 to engage the arbor and releasably hold it in the notch 200. It will be seen that the arms 199 with their arbor-clamping springs 201 constitute a series of holders for the arbors. The magazine 197 is rotated to carry the arbors successively into axial alinement with the work spindle 158. The magazine is slid longitudinally of the arm 192 to move the portions 181 and 182 of the arbor into and out of the collet 169 and the opening 167, respectively. While the blanks are being cut the end 191 of the arbor is rotatively supported in a bearing 203 of a bracket 202 (Fig. 28). Said bracket is slidable on the arm 192 into and out of supporting relation to the arbor. The support 202 is held against rotation upon the arm 192 by means of a spline 204 (Figs. 26 and 28) which is secured to the arm 192 and fits within a keyway 205 in the support 202. The hub portion of the support 202 is split in order that said hub may be contracted to clamp the support rigidly to the arm 192. The means for contracting said hub comprises a screw 206 having its ends provided with right and left-hand threads. Said threaded portions engage correspondingly threaded nuts fixed to opposite sides of the hub. Secured to the screw 206 is a pinion 207 that meshes with rack teeth formed upon one end of a bar 208, said bar being slidable in a longitudinal groove 209 in the arm 192. The opposite end of the bar 208 has rack teeth that mesh with a pinion 210 fixed upon a shaft 211 (Figs. 23 and 28). Upon the opposite end of the shaft 211 is fixed a pinion 212 that meshes with a gear segment 213 which is pivoted at 214 to the slide 140. Rigid with the segment 213 is an arm 215. Pivoted to the arm 215 is a link 216 which may be adjusted in length to correspond with different positions of the slide 140 on the column 143. The lower end of the link 216 is connected to an arm 217 (Fig. 1) pivoted to the machine frame. Rigid with the arm 217 is an arm 218 that carries a roller stud running in the groove of a cam 219 fixed on the cam shaft 110. When the shaft 110 is revolved the bar 208 is reciprocated to unclamp and clamp the support 202.

Between the magazine 197 and the support 202 are two compression springs 220 (Figs. 1, 26 and 28) The means for reciprocating the magazine 197 and the support 202 comprises a bar 221 slidably mounted in the groove 209. On the bar 221 are two stops 222 and 222ª (Fig. 28) between which the support 202 is held. The springs 220 tend to hold the magazine 197 in contact with a stop 223 on the bar 221. 224 is a stop collar fixed on the arm 192 to limit movement of the magazine into operative position. The means for reciprocating the bar 221 comprises a pinion 225 fixed on the shaft 211 and meshing with rack teeth formed upon said bar.

Figures 5, 6, 7:
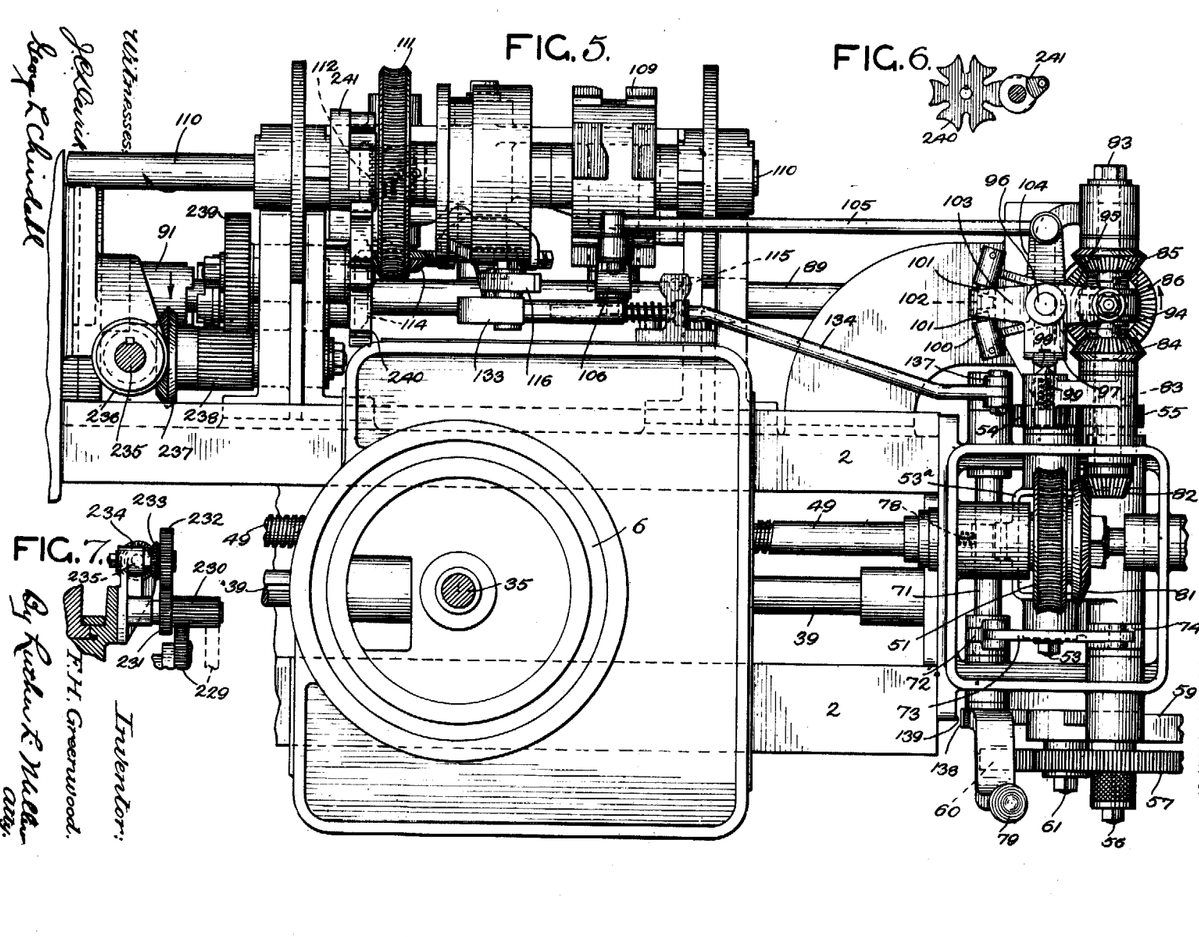
Fig. 5 is a fragmental top plan view, the hob swivel being omitted.
Fig. 6 is a detail view of a Geneva stop mechanism comprised in the machine.
Fig. 7 illustrates one of the gear trains employed in the machine.

The clamp-operating bar 208 must move a short distance after the bar 221 has finished moving the support 202 into operative position. The pinion 225 and the rack on the bar 221 are mutilated to permit the shaft 211 to continue turning after the bar 221 has completed its movement. To prevent the springs 220 from moving the support 202 after the pinion 225 leaves the rack teeth on the bar 221, I provide on said bar a locking projection 26 (Fig. 28) arranged to be engaged by a flange 228 on the shaft 211. Said flange engages the projection 226 a moment before the pinion becomes disengaged from the rack. During the continuing rotation of the shaft 211, the bar 208 causes the support 202 to be clamped on the arm 192. When the shaft 211 is rotated in the opposite direction the movement of the bar 208 causes the support 202 to be unclamped. By the time this has been effected the pinion 225 has engaged the bar 221, whereupon said bar is moved to slide the support 202 out of engagement with the end 191 of the arbor and to slide the magazine 197 to carry the end 181 of the arbor clear of the cap 166. The magazine is then ready to be turned through a partial revolution to bring the next succeeding arbor into axial alinement with the work spindle 158 and the bearing 203. The means for thus rotating the magazine 197 comprises a gear wheel 229 (Figs. 1 and 28) fixed to the hub of the magazine and meshing with a pinion 230 (Figs. 3 and 7). The pinion 230 is long enough so that the wheel 229 remains in mesh therewith during the reciprocation of the magazine. Rigid with the pinion 230 is a gear wheel 231 that meshes with a gear wheel 232. The gear wheel 232 is connected to a bevel gear 233 that meshes with a similar gear 234 on the upper end of a shaft 235. Fixed to the lower end of the shaft 235 is a bevel gear wheel 236 that meshes with a similar gear 237. The gear wheel 237 is rigid with a pinion 238 which meshes with a gear wheel 239. Rigid with the gear wheel 239 is a star wheel 240 (Figs. 5, 6, 29 and 31) which is arranged to be engaged by a pin disk 241 fixed on the cam shaft 110. When the cam shaft 110 is revolved, the magazine 197 is turned through an arc corresponding to the distance between two adjacent arbors.

In order accurately to locate the successive arbors in axial alinement with the work spindle 158, I provide a key 242 (Figs. 28 and 28ª) secured to the overhanging arm 192 and having a pointed or beveled forward end adapted to enter recesses 243 in the hub of the magazine. There are as many recesses as there are pairs of arms 199. When the magazine is slid toward operative position, the beveled end of the key 242 is received in one of the recesses 243, thereby insuring that the arbor is accurately alined with the work spindle, notwithstanding back-lash in the gear train that rotates the magazine.

Fig. 1 shows the parts in the position where the hob is about to commence cutting the gear blanks carried by the lowermost arbor. The carriage 1 is fed through the medium of the worm 52 and worm wheel 51 to carry the hob through the work at low speed. When the hob reaches the position indicated by the circle x in Fig. 1, the projection 115 moves the lever 116 to cause the worm 52 to be lowered out of mesh with the worm wheel 51 and to cause the clutch member 90 to be engaged with the clutch member 91. The shaft 89 is thereby set in rotation, thus driving the bevel gear wheel 86 (Fig. 5). The cam shaft 110 also is driven through the gear train 114, 112 and 111. In the rotation of the cam shaft 110 the cam 109 moves the lever 106 to place the clutch collar 94 in engagement with the bevel gear 85, whereupon the feed screw 49 is driven at high speed through the medium of the shaft 83 and the bevel gears 81 and 82, in the direction to return the hob to the position indicated by the circle y in Fig. 1. In such return movement, the teeth of the hob travel through the tooth spaces of the spur gears just cut. When the hob reaches this position, the cam 109 operates the lever 106 to place the clutch member 94 in engagement with the bevel gear 84, whereupon the carriage 1 is advanced at high speed to carry the hob up to the work, or, in other words, to the position shown in Fig. 1. The cam 109 then places the clutch collar 94 in neutral position, and the cam 123 moves the lever 116 to unclutch the shaft 89 from the shaft 92 and to raise the low-speed worm 52 into mesh with the worm wheel 51.

While the carriage 1 was being thus returned and advanced to working position, the cam shaft 110 was also effecting the operations incident to the removal of the cut gears and the substitution of another group of blanks. After the hob had cleared the cut gears in the return movement of the carriage 1, the cam 219 caused the bar 208 to be moved to unclamp the support 202, the bars 208 and 221 being thereafter moved together, in the course of which movement the support 202 was moved to carry the bearing 203 away from the arbor end 191, and the magazine was slid to carry the arbor end 181 clear of the cap 166. The cam 180 had just previously moved the rod 172 to the right (Fig. 18) to release the arbor from the work spindle. The magazine 197 was then turned to bring the next succeeding arbor into axial alinement with the work spindle and the bearing 203. The cam 219 then moved the magazine 197 in the direction to insert the end 181 of the arbor into the collet 169 and to place the portion 182 of the arbor in the opening 167 of the cap 166, the support 202 being at the same time advanced to place the bearing 203 upon the end 191 of the arbor. When the support 202 reached its operative position, the continuing movement of the rack bar 208 caused the support to be clamped to the arm 192. After the end 181 of the arbor was inserted in the collet, the latter was actuated through the rod 172 to clamp the arbor and hold it firmly against vibration. By the time the work arbor has been thus clamped, the hob has reached the position indicated in Fig. 1. In the continuing travel of the hob, the hob and the arbor are rotated at proper speeds to cause the generation of gear teeth upon the blanks.

At convenient intervals the operator removes from the magazine arbors carrying gears and substitutes arbors loaded with blanks.

If desired two machines similar to the one herein disclosed may be employed, one being provided to "rough out" the gears, and the other machine being used to finish the cutting of the gears. When two machines are to be thus used in succession, it is desirable that the arbors be placed in the second machine in the same relation to the hob that they occupied in the first machine; and to this end the caps 166 of the machines may be provided with unsymmetrical openings 167 as shown in Fig. 21, thus insuring that the arbors occupy the same relation to the hob in both machines.

While I have described the present embodiment of the invention in considerable detail, it will be understood that the invention is not limited to the construction and arrangement of parts herein shown except to the extent indicated by the appended claims, and that the invention may be embodied in machines for cutting various sizes and numbers of gear wheels and other parts susceptible of being produced by the hobbing process.

In certain of the claims I have used the term "product" to denote a gear wheel, a spline shaft, or the like.

I claim as my invention:

1. A hobbing machine having, in combination, a spindle for rotating a work-carrying arbor; a hob; means for rotating the hob in timed relation to the rotation of the arbor; means for feeding the hob; a rotatable arbor magazine; arbors in said magazine; means for intermittently rotating the magazine to carry the arbors successively into axial alinement with the spindle; a collet carried by the spindle; means for sliding the magazine to carry one end of the alined arbor into the collet; and means to actuate the collet to clamp the arbor.

2. A hobbing machine having, in combination, a spindle; a work-carrying arbor arranged to be rotated by the spindle; a hob; means for rotating the hob in timed relation to the rotation of the arbor; means for feeding the hob; means for alining the arbor with the spindle; and means for longitudinally moving the arbor into operative relation to the spindle.

3. A hobbing machine having, in combination, a spindle; a work-carrying arbor arranged to be rotated by the spindle; a hob; means for rotating the hob in timed relation to the rotation of the arbor; means for feeding the hob; means for alining the arbor with the spindle, said spindle having a collet; means for longitudinally moving the arbor to carry one end thereof into the collet; and means for actuating the collet to clamp the arbor.

4. A hobbing machine having, in combination, a spindle for rotating a work-carrying arbor; a hob; means for rotating the hob in timed relation to the rotation of the arbor; means for feeding the hob; an arbor magazine; arbors in the magazine and means for reciprocating the magazine to move the arbor lowermost longitudinally into and out of proximity to the spindle.

5. A hobbing machine having, in combination, a spindle; a work-carrying arbor arranged to be rotated by the spindle; a hob; means for rotating the hob in timed relation to the rotation of the arbor; means for feeding the hob; a reciprocatory device for carrying one end of the arbor into and out of engagement with the spindle; and means for supporting the other end of the arbor.

6. A hobbing machine having, in combination, a spindle; a work-carrying arbor arranged to be rotated by the spindle; a hob; means for rotating the hob in timed relation to the rotation of the arbor; means for feeding the hob; a device for moving one end of the arbor into and out of engagement with the spindle; and a support for the other end of the arbor, said support being reciprocable into and out of supporting relation to the arbor.

7. A hobbing machine having, in combination, a spindle; a work-carrying arbor arranged to be rotated by the spindle; a hob; means for rotating the hob in timed relation to the rotation of the arbor; means for feeding the hob; a support to carry the end of the arbor opposite to that engaged at the spindle; and means for automatically moving said support into and out of supporting relation to the arbor.

8. A hobbing machine having, in combination, a spindle; a work-carrying arbor arranged to be rotated by the spindle; a hob; means for rotating the hob in timed relation to the rotation of the arbor; means for feeding the hob; a support for the end of the arbor opposite to the end engaged at the spindle; means for reciprocating said support into and out of supporting relation to the arbor; a clamp for securing the support in supporting position; and means for operating the clamp.

9. A hobbing machine having, in combination, a magazine for the work; an arm on which said magazine is rotatively mounted; a support slidably mounted on the arm for supporting the work; a clamp to secure the support in operative position on the arm; means for sliding the support; and means extending through the arm for operating the clamp.

10. A hobbing machine having, in combination, a magazine for the work; an arm on which said magazine is rotatively mounted; a support slidably mounted on the arm for supporting the work; a clamp for securing the support in operative position on the arm; and means extending through the arm for sliding the support and operating the clamp.

11. A hobbing machine having, in combination, an arm; a magazine slidably mounted on the arm; a stop to limit sliding movement of the arm; a support slidably mounted on the arm for supporting the work; a bar extending through the arm, said bar having means to engage the magazine and the support; and a spring tending to separate the magazine and the support.

12. A hobbing machine having, in combination, an arm; a magazine and a support slidably mounted on the arm; a spring tending to separate the magazine and the support; and a reciprocatory member for moving the magazine and the support, said member having a projection to engage the support when the member is moved in one direction and a projection to engage the magazine when the member is moved in the opposite direction.

13. A hobbing machine having, in combination, a spindle for rotating a work-carrying arbor; a rotatable arbor magazine; arbors in the magazine; a hob carriage; means for feeding the carriage; a cam shaft controlled by the carriage; means actuated by the cam shaft for rotating the magazine to carry the arbors successively into axial alinement with the spindle; and means actuated by the cam shaft for sliding the magazine to carry the alined arbor into operative relation to the spindle.

14. A hobbing machine having, in combination, a magazine for the work; an arm on which said magazine is rotatively mounted; a support slidable on said arm for supporting the work; and means extending through said arm for moving said support into and out of supporting relation to the work.

15. A hobbing machine having, in combination, a spindle for rotating a work-carrying arbor; a hob; means for rotating the hob in timed relation to the rotation of the arbor; means for feeding the hob; a rotatable arbor magazine; arbors in the magazine; means for intermittently rotating the magazine to carry the arbors successively into axial alinement with the spindle; and means for sliding the magazine to carry the alined arbor into operative relation to the spindle.

16. A hobbing machine having, in combination, a spindle; a work-carrying arbor arranged to be rotated by the spindle; a hob; means for rotating the hob in timed relation to the rotation of the arbor; means for feeding the hob; and means for automatically positioning the arbor in operative relation to the spindle.

17. A hobbing machine having, in combination, a hob carriage; means for feeding the carriage; a magazine for the work; and means controlled by the carriage for operating said magazine.

18. A hobbing machine having, in combination, a rotatable magazine for the work; a hob carriage; means for feeding the carriage; and means controlled by the carriage for rotating the magazine step by step.

19. A hobbing machine having, in combination, a spindle for rotating a work-carrying arbor; an arbor magazine; arbors in the magazine; a hob carriage; means for feeding the carriage; and means operable by the carriage for moving the magazine to carry the arbors successively into axial alinement with the spindle.

20. A hobbing machine having, in combination, a spindle; a work-carrying arbor arranged to be rotated by the spindle; a hob; means for rotating the hob in timed relation to the rotation of the arbor; means for feeding the hob; and means for automatically removing the arbor from the spindle.

21. A hobbing machine having, in combination, a hob carriage; an element for feeding the carriage; means for driving said element at low speed; means for driving said element at high speed; means for disconnecting the low speed driving means upon the completion of the working stroke of the carriage; means for connecting the high speed driving means to said feed element; and means for reversing the direction of operation of the high speed driving means at the end of the return movement.

22. A hobbing machine magazine having, in combination, a series of pairs of holders, and gear-blank arbors each supported by a pair of said holders.

23. A hobbing machine magazine having, in combination, a hub, pairs of arms attached to the hub, and yielding devices attached to said arms for holding gear-blank arbors.

24. A hobbing machine having, in combination, a spindle for rotating a blank-carrying arbor, an arbor magazine supported for rotation upon an axis parallel with the spindle, arbors supported in the magazine parallel with the spindle, means for rotating the magazine to carry the arbors succesively into axial alinement with the spindle, means for connecting one end of an alined arbor with the spindle, a support for the other end of the alined arbor, said support being reciprocable into and out of supporting relation to the arbor, and means to cut a blank on the alined arbor.

25. A hobbing machine having, in combination, a spindle for rotating a blank-carrying arbor, an arbor magazine supported for rotation upon an axis parallel with the spindle, arbors supported in the magazine parallel with the spindle, means for rotating the magazine to carry the arbors successively into axial alinement with the spindle, means for connecting one end of an alined arbor with the spindle, means for supporting the other end of the alined arbor, and means to cut a blank on the alined arbor.

26. A hobbing machine having, in combination, a rotatory spindle having a non-circular opening in one end, a blank-carrying arbor having a non-cylindrical portion adapted to fit into said opening, means for inserting said arbor portion into said opening, means for clamping the arbor to the spindle, means for cutting a blank carried by the arbor, and means for withdrawing the arbor from said opening.

27. A hobbing machine having, in combination, a rotatory spindle having a driving portion, a clamp within the spindle adjacent to the driving portion, a blank-carrying arbor arranged to be engaged by the driving portion and having a part adapted to enter the clamp, means for moving the arbor into engagement with said driving portion and clamp, means for actuating the clamp, means for cutting a blank mounted on said arbor, and means for withdrawing the arbor from said driving portion and said clamp.

28. A hobbing machine having, in combination, a spindle for rotating a blank-carrying arbor; an arbor magazine supported for rotation upon an axis parallel with the spindle; arbors supported in the magazine parallel with the spindle; means for rotating the magazine to carry the arbors successively into axial alinement with the spindle; and means to cut the blank on the alined arbor.

29. A hobbing machine having, in combination, a work-carrying arbor; a spindle for rotating the arbor; a hob; means for rotating the hob in timed relation to the rotation of the arbor; means for feeding the hob; and means for automatically connecting the arbor to and disconnecting it from the spindle.

30. A hobbing machine having, in combination, a work-carrying arbor; a spindle for rotating the arbor; a hob; means for rotating the hob in timed relation to the rotation of the arbor; means for feeding the hob; and means for moving the arbor longitudinally into and out of proximity to the spindle.

31. A hobbing machine having, in combination, a rotatory spindle having a non-circular opening in one end, a clamping device within the spindle near said end, a blank-carrying arbor having an non-cylindrical portion adapted to fit into the opening in the spindle and a portion adapted to enter the clamp, means for inserting said arbor portions into said opening and clamp, means for actuating the clamp, means for cutting a blank carried by the arbor, and means for withdrawing the arbor from said opening and clamp.

32. A hobbing machine, having, in combination, a rotatory spindle having a non-circular opening in one end, a clamping device within the spindle near said end, a blank-carrying arbor having a non-cylindrical portion adapted to fit into the opening in the spindle and a portion adapted to enter the clamp, automatically-actuated means for opening and closing the clamp, and means for cutting a blank carried by the arbor.

33. A hobbing machine having, in combination, a rotatory spindle having a non-circular opening in one end, a blank-carrying arbor having a non-cylindrical portion adapted to fit into the opening in the spindle, automatically-actuated means for clamping the arbor to the spindle, and means for cutting a blank carried by the arbor.

34. A hobbing machine having, in combination, a rotatory spindle having a driving portion, a clamp within the spindle adjacent to the driving portion, a blank-carrying arbor arranged to be engaged by the driving portion and having a part adapted to enter the clamp, automatically-actuated means for opening and closing the clamp, and means for cutting a blank mounted on said arbor.

35. A hobbing machine having, in combination, a rotatory spindle, a clamp within the spindle, a blank-carrying arbor having a part adapted to enter the clamp, automatically actuated means for opening and closing the clamp, and means for cutting a blank mounted on said arbor.

36. A hobbing machine having, in combination, a spindle having a non-cylindrical opening in one end, a collet in the spindle adjacent to said opening, a blank-carrying arbor having an end portion adapted to pass through said opening and enter the collet, said arbor also having a non-cylindrical portion adapted to lie within said opening, means for actuating the collet to clamp said end portion of the arbor, and means for cutting a blank carried by the arbor.

37. A hobbing machine having, in combination, a rotatory spindle, a collet in one end of the spindle, a blank-carrying arbor having an end portion adapted to enter the collet, means for actuating the collet to clamp said end portion of the arbor, and means for cutting a blank carried by the arbor.

38. A hobbing machine having, in combination, a rotatory spindle, a series of blank-carrying arbors, means for feeding successive arbors into alinement with the spindle, means to connect each arbor to the spindle when alined, and means to cut a blank on each arbor when alined.

39. A hobbing machine having, in combination, a rotatory spindle, a series of blank-carrying arbors, means for connecting successive arbors to the spindle and disconnecting them therefrom, and a hob arranged to cut a blank on each arbor when rotated by the spindle.

40. A hobbing machine having, in combination, a rotatory spindle, automatically-actuated means for securing a blank to the spindle and for removing the product from the spindle, a carriage, a hob on the carriage, means for rotating the hob in timed relation to the rotation of the spindle and blank, an element for feeding the carriage to carry the hob into and out of tooth-generating relation to the blank, means for driving said feed element at low speed, means for driving said feed element at high speed, means for disconnecting the low-speed driving means upon the completion of the working stroke of the carriage, means for connecting the high-speed driving means to said feed element, and means for reversing the direction of operation of the high-speed driving means at the end of the return movement.

41. A hobbing machine having, in combination, a rotatory spindle, automatically-actuated means for securing a blank to the spindle and for removing the product from the spindle, a hob, means for rotating the hob in timed relation to the rotation of the spindle and blank, and means for feeding the hob into tooth-generating relation to the blank.

42. A hobbing machine magazine having, in combination, a hub, pairs of arms attached to said hub, and devices attached to said arms for rotatably supporting gear-blank arbors.

43. In a hobbing machine, a plurality of gear-blank arbors, and a rotatable magazine having means for rotatably supporting the arbors with their axes extending parallel with the axis of the magazine.

44. A hobbing machine magazine having, in combination, a rotatory spindle, a series of pairs of holders, a gear-blank arbor supported by each pair of holders, means for moving said series to bring successive arbors into alinement with the spindle, and means for connecting an alined arbor to the spindle.

45. A hobbing machine having, in combination, an arbor for supporting intermediate its ends a plurality of blanks, means engaging one end of the arbor for rotating it, a support for the other end of the arbor, a hob, means for rotating the hob in timed relation to the arbor, and automatically actuated means for feeding the hob past the blanks and for returning the hob to starting position.

In testimony whereof I have hereunto set my hand.

FRED H. GREENWOOD.

It is hereby certified that in Letters Patent No. 1,304,874, granted May 27, 1919, upon the application of Fred H. Greenwood, of Rockford, Illinois, for an improvement in "Automatic Hobbing-Machines," errors appear requiring correction as follows: In the grant and in the heading to the printed specification, assignment, name of the first-mentioned assignee, for "Howard C. Colman" read *Howard D. Colman;* in the printed specification, page 5, line 87, for reference-numeral "26" read *226;* and that the said Letters Patent should be read with these corrections therein that the same may conform to the record of the case in the Patent Office.

Signed and sealed this 1st day of July, A. D., 1919.

[SEAL.]

J. T. NEWTON,
*Commissioner of Patents.*

Cl. 90—4.